(12) United States Patent
Noh et al.

(10) Patent No.: US 9,265,037 B2
(45) Date of Patent: Feb. 16, 2016

(54) TRANSMITTING AND RECEIVING UPLINK CONTROL CHANNEL

(71) Applicant: KT CORPORATION, Gyeonggi-do (KR)

(72) Inventors: Min Seok Noh, Seoul (KR); Woo-Jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 237 days.

(21) Appl. No.: 14/024,855

(22) Filed: Sep. 12, 2013

(65) Prior Publication Data

US 2014/0078942 A1  Mar. 20, 2014

(30) Foreign Application Priority Data

Sep. 14, 2012 (KR) .................. 10-2012-0102352
Dec. 14, 2012 (KR) .................. 10-2012-0146600

(51) Int. Cl.

| | |
|---|---|
| *H04J 3/24* | (2006.01) |
| *H04W 72/04* | (2009.01) |
| *H04L 5/14* | (2006.01) |
| *H04L 1/00* | (2006.01) |
| *H04L 1/16* | (2006.01) |
| *H04W 88/08* | (2009.01) |
| *H04L 5/00* | (2006.01) |
| *H04L 1/18* | (2006.01) |

(52) U.S. Cl.
CPC .......... *H04W 72/0413* (2013.01); *H04L 1/0026* (2013.01); *H04L 1/1671* (2013.01); *H04L 5/143* (2013.01); *H04L 1/1896* (2013.01); *H04L 5/001* (2013.01); *H04L 5/0023* (2013.01); *H04L 5/0028* (2013.01); *H04L 5/0048* (2013.01); *H04L 5/0053* (2013.01); *H04W 88/085* (2013.01)

(58) Field of Classification Search
CPC .......... H04W 72/0413; H04W 88/085; H04L 5/143; H04L 1/0026; H04L 1/1671; H04L 5/001; H04L 5/0023; H04L 5/0028; H04L 5/0048; H04L 5/0053; H04L 1/1896
See application file for complete search history.

(56) References Cited

U.S. PATENT DOCUMENTS

| | | | |
|---|---|---|---|
| 9,060,376 B2 * | 6/2015 | Noh et al. | |
| 2004/0166886 A1 | 8/2004 | Laroia et al. | |
| 2004/0166887 A1 | 8/2004 | Laroia et al. | |
| 2007/0149126 A1 | 6/2007 | Rangan et al. | |
| 2007/0149128 A1 | 6/2007 | Das et al. | |
| 2007/0149129 A1 | 6/2007 | Das et al. | |
| 2007/0149131 A1 | 6/2007 | Li et al. | |
| 2007/0149132 A1 | 6/2007 | Li et al. | |

(Continued)

FOREIGN PATENT DOCUMENTS

| | | |
|---|---|---|
| KR | 10-1062645 B1 | 9/2011 |
| KR | 10-2012-0081367 A | 7/2012 |

OTHER PUBLICATIONS

Korean Intellectual Property Office, International Search Report for International Application No. PCT/KR2013/008283, Dec. 23, 2013.

(Continued)

*Primary Examiner* — Robert Wilson
(74) *Attorney, Agent, or Firm* — IP Legal Services, LLC (57) ABSTRACT

The disclosure is related to transmitting a control channel, multiplexing an uplink control channel, and multiplexing a sounding reference signal for user equipment configured with carrier aggregation.

24 Claims, 6 Drawing Sheets

(56) References Cited

U.S. PATENT DOCUMENTS

| | | |
|---|---|---|
| 2007/0149137 A1 | 6/2007 | Richardson et al. |
| 2007/0149138 A1 | 6/2007 | Das |
| 2007/0149194 A1 | 6/2007 | Das et al. |
| 2007/0149227 A1 | 6/2007 | Parizhsky et al. |
| 2007/0149228 A1 | 6/2007 | Das |
| 2007/0149238 A1 | 6/2007 | Das et al. |
| 2007/0159969 A1 | 7/2007 | Das et al. |
| 2007/0168326 A1 | 7/2007 | Das et al. |
| 2007/0213087 A1 | 9/2007 | Laroia et al. |
| 2007/0249287 A1 | 10/2007 | Das et al. |
| 2007/0249360 A1 | 10/2007 | Das et al. |
| 2007/0253357 A1 | 11/2007 | Das et al. |
| 2007/0253358 A1 | 11/2007 | Das et al. |
| 2007/0253449 A1 | 11/2007 | Das et al. |
| 2007/0258365 A1 | 11/2007 | Das et al. |
| 2010/0211540 A9 | 8/2010 | Das et al. |
| 2010/0220626 A1 | 9/2010 | Das et al. |
| 2010/0272019 A1 | 10/2010 | Papasakellariou et al. |
| 2012/0120817 A1 | 5/2012 | Khoshnevis et al. |
| 2012/0207109 A1 | 8/2012 | Pajukoski et al. |
| 2013/0279480 A1 | 10/2013 | Park et al. |
| 2014/0003452 A1* | 1/2014 | Han et al. .......... 370/474 |
| 2014/0078942 A1* | 3/2014 | Noh et al. .......... 370/280 |
| 2014/0105141 A1* | 4/2014 | Noh et al. .......... 370/329 |
| 2014/0140323 A1* | 5/2014 | Son et al. .......... 370/331 |
| 2014/0362797 A1* | 12/2014 | Aiba et al. .......... 370/329 |

OTHER PUBLICATIONS

Korean Intellectual Property Office, Written Opinion of the International Searching Authority for International Application No. PCT/KR2013/008283, Dec. 23, 2013.

* cited by examiner

TRANSMITTING AND RECEIVING UPLINK CONTROL CHANNEL

CROSS REFERENCE TO PRIOR APPLICATIONS

The present application claims priority under 35 U.S.C. §119 to Korean Patent Application No. 10-2012-0102352 (filed on Sep. 14, 2012) and Korean Patent Application No. 10-2012-0146600 (filed on Dec. 14, 2012), which are hereby incorporated by reference in their entirety.

BACKGROUND

The present disclosure relates to transmitting and multiplexing an uplink control channel and multiplexing a sounding reference signal for user equipment configured with carrier aggregation.

SUMMARY

In accordance with at least one embodiment, a method is provided for transmitting an uplink control channel at user equipment configured with a physical uplink control channel (PUCCH) format 3. The method includes: receiving a first parameter, through an associated higher layer signaling, from a transmission/reception point, wherein the first parameter instructs simultaneous transmission of single hybrid automatic repeat request (HARQ) acknowledgement/negative-acknowledgement (ACK/NACK) and channel state information (CSI) on a PUCCH using PUCCH format 2/2a/2b; receiving a second parameter, through an associated higher layer signaling, from a transmission/reception point, wherein the second parameter instructs simultaneous transmission of multiple HARQ ACK/NACK and CSI on a PUCCH using the PUCCH format 3; and performing simultaneous transmission of HARQ ACK/NACK and CSI on a PUCCH using PUCCH format 2/2a/2b, and the PUCCH format 3 according to configurations of the first parameter and the second parameter.

In accordance with at least one embodiment, a method is provided for receiving an uplink control channel at a transmission/reception point. The method includes: transmitting a first parameter, through an associated higher layer signaling, to user equipment, wherein the first parameter instructs simultaneous transmission of single hybrid automatic repeat request (HARQ) acknowledgement/negative-acknowledgement (ACK/NACK) and channel state information (CSI) using physical uplink control channel (PUCCH) format 2/2a/2b; transmitting a second parameter, through an associated higher layer signaling, to the user equipment, wherein the second parameter instructs simultaneous transmission of multiple HARQ ACK/NACK and CSI using a PUCCH format 3; and receiving a PUCCH that performs simultaneous transmission of HARQ ACK/NACK and CSI using PUCCH format 2/2a/2b and the PUCCH format 3 according to configurations of the first parameter and the second parameter if the user equipment is configured with the PUCCH format 3.

In accordance with at least one embodiment, user equipment configured with a physical uplink control channel (PUCCH) format 3 is provided. The user equipment includes a receiver and a transmitter. The receiver is configured to receive a first parameter, through an associated higher layer signaling, from a transmission/reception point, wherein the first parameter instructs simultaneous transmission of single hybrid automatic repeat request (HARQ) acknowledgement/negative-acknowledgement (ACK/NACK) and channel state information (CSI) on a PUCCH using PUCCH format 2/2a/2b. The receiver is configured to receive a second parameter, through an associated higher layer signaling, from a transmission/reception point, wherein the second parameter instructs simultaneous transmission of multiple HARQ ACK/NACK and CSI on a PUCCH using the PUCCH format 3. The transmitter is configured to perform simultaneous transmission of HARQ ACK/NACK and CSI on a PUCCH using PUCCH format 2/2a/2b and the PUCCH format 3 according to configurations of the first parameter and the second parameter.

In accordance with at least one embodiment, a transmission/reception point is provided. The transmission/reception point includes a transmitter and a receiver. The transmitter is configured to transmit a first parameter, through an associated higher layer signaling, to user equipment, wherein the first parameter instructs simultaneous transmission of single hybrid automatic repeat request (HARQ) acknowledgement/negative-acknowledgement (ACK/NACK) and channel state information (CSI) using physical uplink control channel (PUCCH) format 2/2a/2b. The transmitter is configured to transmit a second parameter, through an associated higher layer signaling, to the user equipment, wherein the second parameter instructs simultaneous transmission of multiple HARQ ACK/NACK and CSI using a PUCCH format 3. The receiver is configured to receive a PUCCH that performs simultaneous transmission of HARQ ACK/NACK and CSI using PUCCH format 2/2a/2b and the PUCCH format 3 according to configurations of the first parameter and the second parameter if the user equipment is configured with the PUCCH format 3.

DETAILED DESCRIPTION OF EMBODIMENTS

Hereinafter, exemplary embodiments of the present invention will be described with reference to the accompanying drawings. In the following description, the same elements will be designated by the same reference numerals although they are shown in different drawings. Furthermore, in the following description of the present embodiment, a detailed description of known functions and configurations incorporated herein will be omitted when it may make the subject matter of the present embodiment unclear.

A wireless communication system in accordance with at least one embodiment may be widely used in order to provide a variety of communication services such as a voice service, a packet data service, and so forth. The wireless communication system may include user equipment (UE) and at least one transmission/reception point. In the present description, the term "user equipment (UE)" is used as a general concept that includes a terminal in wireless communication. Accordingly, the user equipment (UE) should be construed as a concept that includes a mobile station (MS), a user terminal (UT), a subscriber station (SS), and/or a wireless device in a global system for mobile communications (GSM), as well as user equipment used in wideband code division multiple access (WCDMA), long term evolution (LTE), and/or high speed packet access (HSPA).

The transmission/reception point may indicate a station that communicates with the user equipment. Such a transmission/reception point may be referred to as different terms, for example, a base station (BS), a cell, a Node-B, an evolved Node-B (eNB), a sector, a site, a base transceiver system (BTS), an access point (AP), a relay node (RN), a remote radio head (RRH), a radio unit (RU), and the like.

That is, in the present description, the base station (BS) or the cell may be construed as an inclusive concept indicating a portion of an area or a function covered by a base station controller (BSC) in code division multiple access (CDMA), a Node-B in WCDMA, an eNB or a sector (a site) in LTE, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the present description, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

The wireless communication system may use a variety of multiple access schemes such as CDMA, time division multiple access (TDMA), frequency division multiple access (FDMA), orthogonal frequency division multiple access (OFDMA), OFDM-FDMA, OFDM-TDMA, OFDM-CDMA, and/or the like. Such multiple access schemes, however, are not limited thereto. At least one embodiment may be applied to resource allocation in the field of asynchronous wireless communications evolving to LTE and LTE-advanced (LTE-A) through GSM, WCDMA, and HSP, and in the field of synchronous wireless communications evolving into CDMA, CDMA-2000, and UMB. The present embodiment should not be construed as being limited to or restricted by a particular wireless communication field, and should be construed as including all technical fields to which the spirit of the present embodiment can be applied.

In the case of an uplink transmission and a downlink transmission, at least one of a time division duplex (TDD) and a frequency division duplex (FDD) may be used. Herein, the TDD may perform the uplink/downlink transmissions using different times. The FDD may perform the uplink/downlink transmissions using different frequencies.

In a LTE or LTE-A system in conformance with a corresponding standard, an uplink and/or a downlink may be formed based on one carrier or a pair of carriers. In the case of the uplink and/or downlink, control information may be transmitted through such control channels as a physical downlink control channel (PDCCH), a physical control format indicator channel (PCFICH), a physical hybrid ARQ indicator channel (PHICH), a physical uplink control channel (PUCCH), and/or so forth. Data may be transmitted through such data channels as a physical downlink shared channel (PDSCH), a physical uplink shared channel (PUSCH), and/or the like.

In the description, the term "cell" may indicate one of coverage of a signal transmitted from a transmission point or transmission/reception point, a component carrier having the coverage, and the transmission/reception point. Herein, the term "transmission/reception point" may indicate one of a transmission point transmitting a signal, a reception point receiving a signal, and a combination thereof (i.e., a transmission/reception point).

In the present description, a term "HARQ ACK/NACK" is an abbreviation of hybrid automatic repeat request acknowledgement/negative-acknowledgement and may be referred to as a hybrid-ARQ acknowledgement. A term "CSI" is an abbreviation of channel station information. CSI might means a channel state information report, for example, a rank indicator (RI), a precoding matrix indicator (PMI), and a channel quality indicator (CQI).

Figure 1:
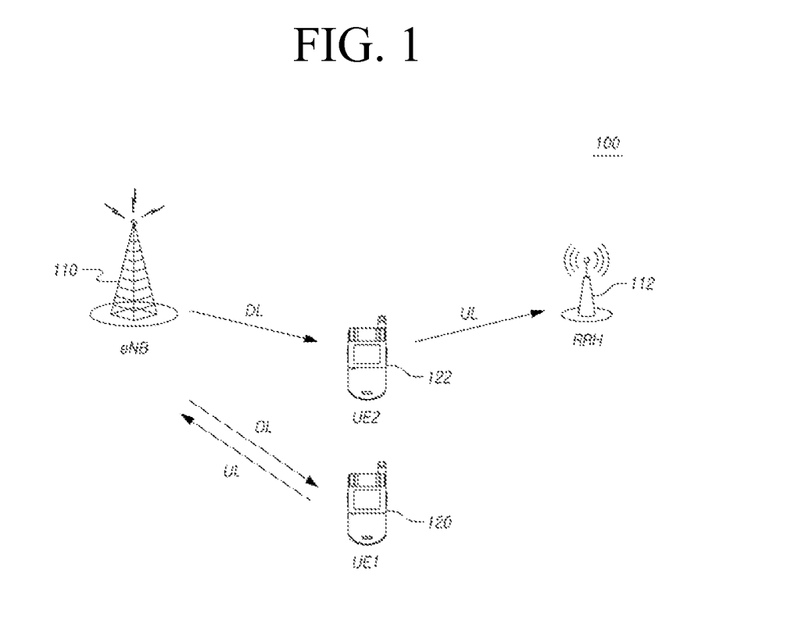
FIG. 1 is an exemplary diagram illustrating a wireless communication system to which at least one embodiment may be applied.

FIG. 1 is an exemplary diagram illustrating a wireless communication system to which at least one embodiment may be applied.

Referring to FIG. 1, wireless communication system 100 might be one of a coordinated multi-point transmission/reception (CoMP) system, a coordinated multi-antenna transmission system, and a coordinated multi-cell communication system. Herein, the CoMP system transmits signals through cooperation among a plurality of transmission/reception points. Wireless communication system 100 such as a CoMP system may include a plurality of transmission/reception points 110 and 112 and at least one user equipment (UE) 120 or 122.

As shown in FIG. 1, the transmission/reception points might be one of eNB 110 and RRH 112. Herein, eNB 110 might be a base station or a macrocell (or macronode). RRH 112 might be at least one picocell coupled to and controlled by eNB 110 through an optical cable or an optical fiber. Furthermore, RRH 112 might have either a high transmission power or a low transmission power within a macrocell region. The transmission/reception points (e.g., eNB 110 and RRH 112) might have the same cell identity (ID) or different cell identities.

Hereinafter, a downlink (DL) represents communication or a communication path from transmission/reception points 110 and 112 to user equipment 120. An uplink (UL) represents communication or a communication path from user equipment 120 to transmission/reception points 110 and 112. In the downlink, a transmitter is a portion of transmission/reception points 110 and 112 and a receiver is a portion of user equipment 120 and 122. In the uplink, a transmitter is a portion of user equipment 120, and a receiver is a portion of transmission/reception points 110 and 112.

Hereinafter, a situation in which a signal is transmitted or received through such channels as a PUCCH, a PUSCH, a PDCCH, and/or a PDSCH may be referred to by the expression "transmit or receive a PUCCH, a PUSCH, a PDCCH, and/or a PDSCH."

eNB (e.g., 110) performs downlink transmission to user equipment (e.g., 120 and/or 122). eNB (e.g., 110) transmits a PDSCH corresponding to a primary physical channel, for unicast transmission. Furthermore, eNB (e.g., 110) transmits a PDCCH in order to transmit downlink control information, such as scheduling information required for receiving a PDSCH and to transmit scheduling grant information for uplink data channel (e.g., PUSCH) transmission. Hereinafter, "transmit or receive a signal through a channel" may be referred to as the expression of "transmit or receive a channel."

First user equipment (UE1) 120 might transmit an uplink signal to eNB 110. Second user equipment (UE2) 122 might transmit an uplink signal to at least one of transmission and reception points 110 and 112, for example, to RRH 112. In this case, first user equipment 120 transmits an uplink signal to RRH 112 and second user equipment 122 transmits an uplink signal to eNB 110. FIG. 1 exemplary illustrates two user equipments 120 and 122 in the communication system, but the present invention is not limited thereto. More than two user equipments might be included the communication system. For convenience and ease of understanding, the communication system will be described as including two user equipments 120 and 122, one transmitting an uplink signal to eNB 110 and the other transmitting an uplink signal to RRH 112.

In a wireless communication system, user equipment transmits an uplink demodulation reference signal (UL DMRS or a UL DM-RS) at every slot when an uplink is transmitted. Such a UL DMRS is transmitted to determine channel information for data channel demodulation. In case of an uplink DMRS associated with a PUSCH, a reference signal is transmitted for one symbol per each slot. In case of an uplink DMRS associated with a PUCCH, a reference signal might be transmitted differently according to a type of a PUCCH. For example, when a PUCCH format is one of a PUCCH format 1, a PUCCH format 1a, and a PUCCH format 1b, a reference signal is transmitted for three symbols per each slot. When a PUCCH format is PUCCH format 2/2a/2b and a PUCCH format 3, a reference signal is transmitted for two symbols per each slot.

The PUCCH is used as an uplink control channel and is associated with a format classified according to a type of information transmitted from user equipment. Table 1 shows PUCCH formats.

TABLE 1

| PUCCH format | Modulation scheme | Number of bits per subframe, $M_{bit}$ |
| --- | --- | --- |
| 1 | N/A | N/A |
| 1a | BSPK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

The PUCCH format 1, the PUCCH format 1a, and the PUCCH format 1b might be used for transmitting a scheduling request (SR) and HARQ-ACK. The PUCCH format 2, the PUCCH format 2a, and the PUCCH format 2b might be used for transmitting a channel quality indicator (CQI), a precoding matrix indicator (PMI), and a rank indicator (RI). The PUCCH format 3 might be used for transmitting multiple HARQ ACK/NACK.

Hereinafter, each PUCCH format and usages thereof will be described in detail.

The PUCCH format 1 is a channel format for transmitting only a scheduling request (SR). The PUCCH format 1a and the PUCCH format 1b are channel formats for transmitting a scheduling request (SR) and/or ACK/NACK for a downlink data channel. The PUCCH format 1a and the PUCCH format 1b are classified according to the number bits of ACK/NACK and an associated modulation scheme. Meanwhile, a shortened PUCCH format 1a has the same structure of the PUCCH format 1a with the last SC-FDMA symbol of a subframe punctured. Further, a shortened PUCCH format 1b has the same structure of the PUCCH format 1b with the last SC-FDMA symbol of a subframe punctured. One of the PUCCH formats might be selected and used based on a value (e.g., TRUE or FALSE) of a RRC parameter (e.g., ackNackSRS-SimultaneousTransmission) and cell-specific information of a sounding reference symbol (SRS), provided by an associated higher layer of a transmission/reception point.

The PUCCH format 2 is a channel format dedicated for transmitting a channel quality indicator (CQI). The PUCCH format 2a and the PUCCH format 2b are channel formats for transmitting ACK/NACK in response to CQI+ downlink data channel. The PUCCH formats 2a and 2b are classified according to the bit number of ACK/NACK and a modulation scheme.

The PUCCH format 3 is a channel format for transmitting ACK/NACK having more than four bits in downlink carrier aggregation. A shortened PUCCH format 3 has the same structure of the PUCCH format 3 with the last SC-FDMA symbol of one subframe punctured. That is, the last SC-FDMA symbol of the shortened PUCCH format 3 is not mapped with resource elements. One of the PUCCH formats might be selected and used based on a value (TRUE or FALSE) of a RRC parameter (e.g., ackNackSRS-SimultaneousTransmission) and cell-specific information of a SRS, provided by an associated higher layer of a transmission/reception point.

For an LTE communication system, an uplink demodulation reference signal (DMRS or DM-RS) and an uplink sounding reference signal (SRS) are defined. Further, three downlink reference signals (RS) are defined. Three downlink reference signals (RS) include a cell-specific reference signal (CRS), a multicast/broadcast over signal frequency network reference signal (MBSFN-RS), and user equipment specific reference signal (UE-specific reference signal).

An uplink sounding reference signal (SRS) might be used for measuring an uplink channel state for uplink frequency-dependent scheduling. Such an uplink SRS might be also used for measuring uplink and downlink channel states in order for downlink beam-forming using channel reciprocity in a time division duplex (TDD) system. In these cases, a corresponding transmission/reception point transmits parameters, such as RRC parameters, to user equipment 120. User equipment 120 receive the RRC parameters, obtains predetermined information from the received RRC parameters, and transmits an uplink SRS. For example, the RRC parameters for generating the SRS might include parameters related to a cell-specific SRS bandwidth of a SRS, a transmission comb, a UE-specific SRS bandwidth, hopping, frequency domain position, periodicity, subframe configuration, antenna configuration, a base sequence index, and a cyclic shift index. The parameter for the transmission comb is for assigning a frequency position which is allocated in a gap of two subcarrier spacing. For example, the transmission comb parameter has a value of 0 for even subcarriers or a value of 1 for odd carriers. The parameter for subframe configuration is used for assigning a subframe to transmit a SRS. The parameter for the antenna configuration indicates the number of antennas and the number of antenna ports for transmitting a SRS. The parameter for the base sequence index which is determined based on a sequence group number u used in a PUCCH and a sequence number v determined according to a sequence hopping configuration. The parameter for the cyclic shift index might be a reference signal used for generating a SRS and decided according to a sequence number v.

In addition to the periodic SRS, an aperiodic SRS is defined. Similar to the periodic SRS, a transmission/reception point transmits various types of parameters to user equipment 120, as RRC parameters, for generating the aperiodic SRS. The transmitted parameters include parameters related to a UE-specific SRS bandwidth, a transmission comb, a frequency domain position, a periodicity, a subframe configuration, an antenna configuration, a base sequence index, and a cyclic shift index.

In addition, a transmission/reception point for transmitting the aperiodic SRS dynamically instructs user equipment 120 to transmit the aperiodic SRS through a PDCCH. User equipment 120 is instructed by the PDCCH, receives RRC parameters, and transmits an uplink aperiodic SRS.

Hereinafter, an operation of user equipment for simultaneous transmission of an uplink PUCCH and a sounding reference signal within one subframe will be described.

The operation for simultaneous transmission of a PUCCH and a SRS is defined according to a PUCCH format type and a type of a SRS, for example, a periodic SRS (e.g., type-0 SRS) and an aperiodic SRS (e.g., type-1 SRS). Further, such operation of user equipment is defined in consideration of adapting multiple component subcarriers.

An operation of user equipment according to a SRS type (e.g., a periodic SRS and an aperiodic SRS) and a PUCCH format will be described as follows.

i) User equipment does not transmit a periodic SRS when simultaneous transmission of PUCCH formats 2, 2a, and 2b and a periodic SRS is instructed at the same subframe.

ii) User equipment does not transmit an aperiodic SRS when simultaneous transmission of PUCCH formats 2, 2a, and 2b including ACK/NACK and an aperiodic SRS is triggered at the same subframe.

iii) User equipment does not transmit a PUCCH format 2 when simultaneous transmission of the PUCCH format 2 not including ACK/NACK and an aperiodic SRS is triggered at the same subframe.

iv) User equipment does not transmit a SRS if a parameter ackNackSRS-SimultaneousTransmission is set FALSE when a SRS and a PUCCH format transmitting both or one of ACK/NACK and a SR is instructed at the same subframe. The parameter ackNackSRS-SimultaneousTransmission is defined by an associated higher layer and the SRS includes a periodic SRS and an aperiodic SRS.

v) User equipment transmits both of a shortened PUCCH format and a SRS if a parameter ackNackSRS-SimultaneousTransmission is set TRUE when simultaneous transmission of a SRS and a shortened PUCCH format for transmitting both or one of ACK/NACK and a positive SR is instructed at the same subframe. The parameter ackNackSRS-SimultaneousTransmission is defined by an associated higher layer and the SRS includes a periodic SRS and an aperiodic SRS.

vi) User equipment does not transmit a SRS when simultaneous transmission of a SRS in a serving cell and a PUCCH format for transmitting both or one of a positive ACK/NACK and a positive SR using a normal PUCCH format is instructed at the same subframe. Herein, the SRS includes a periodic SRS and an aperiodic SRS.

For example, the parameter ackNackSRS-SimultaneousTransmission is provided by an associated higher layer as a RRC parameter. Such a RRC parameter is used for determining instructing of user equipment to perform simultaneous transmission of HARQ ACK/NACK and a SRS on a PUCCH at one subframe. In case that the parameter is set support simultaneous transmission of HARQ ACK/NACK and a SRS on a PUCCH at one subframe, user equipment simultaneously transmits HARQ ACK/NACK and a SRS using a shortened format if a corresponding subframe is a cell-specific SRS subframe in a view of a first cell (e.g., primary cell, primary component carrier, Pcell). In this case, a shortened PUCCH format is used for simultaneous transmission regardless of whether a SRS is transmitted at the corresponding subframe. When the corresponding subframe is not a cell-specific SRS subframe, user equipment performs simultaneous transmission of HARQ ACK/NACK and a SRS using one of normal PUCCH formats 1, 1a, 1b, and a normal PUCCH format 3.

Hereinafter, an operation of user equipment for simultaneous transmission of ACK/NACK and a periodic CSI at one subframe on an uplink PUCCH will be described.

Figure 2:
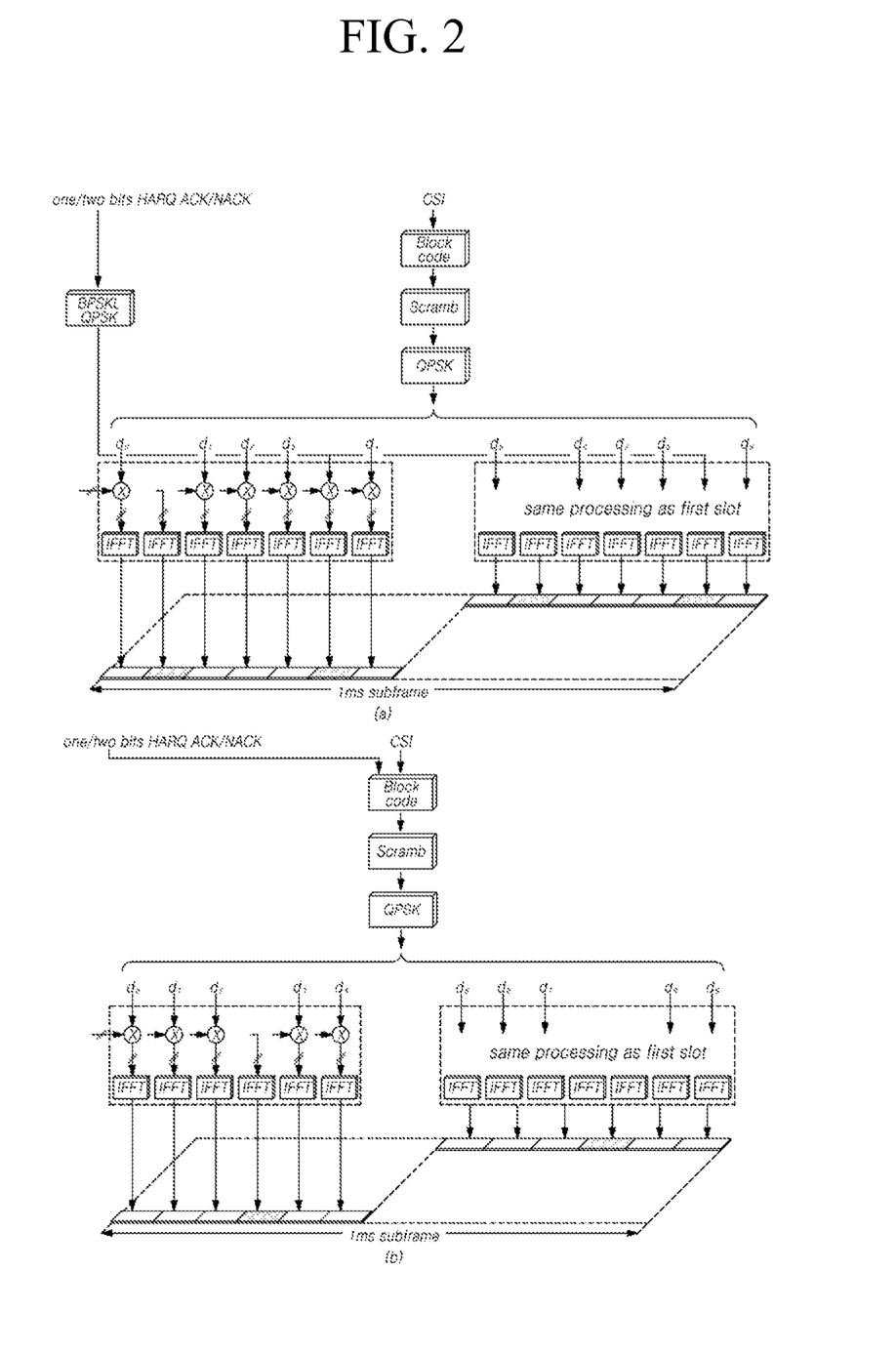
FIG. 2 is a diagram illustrating simultaneous transmission of HARQ ACK/NACK and a CSI using a PUCCH format 2 in accordance with at least one embodiment.

FIG. 2 is a diagram illustrating simultaneous transmission of HARQ ACK/NACK and a CSI using a PUCCH format 2 in accordance with at least one embodiment.

Referring to a diagram (a) of FIG. 2, HARQ ACK/NACK and a CSI are simultaneously transmitted using a PUCCH format 2 in case of a normal cyclic prefix (CP). In this case, CSI block information is block-coded and modulated using QPSK. As a result, a subframe includes ten symbols. The first five symbols are transmitted at the first slot and the remaining five symbols are transmitted at the second slot.

Each slot includes seven DFTS-OFDM symbols. Among the seven DFTS-OFDM symbols, two symbols are used for transmission of an uplink DM-RS. When simultaneously transmitting HARQ ACK/NACK and a CSI, a second DM-RS symbol in each slot is modulated by HARQ ACK/NACK. One of a BPSK modulation scheme or a QPSK modulation scheme is used according to whether feedback information is one HARQ ACK/NACK bit or two HARQ ACK/NACK bits. Each one of five QPSK symbol transmitted at each slot and the second symbol of the DM-RS symbols, which is modulated by HARQ ACK/NACK, are multiplied by a cyclic shifted length-12 cell-specific sequence. The result thereof is transmitted using a corresponding DFTS-OFDM symbol.

Referring to a diagram (b) of FIG. 2, in case of an extended cyclic prefix (CP) having six DFTS-OFMS symbols per each slot, the same structure is used. However, each slot includes one uplink DM-RS symbol, instead of two uplink DM-RS symbols. CSI transmission information and HARQ ACK/NACK are block-coded and modulated using a QPSK modulation scheme. As a result, each subframe includes ten symbols. The first five symbols are transmitted at the first slot and the remaining five symbols are transmitted at the second slot. Each one of five QPSK symbols transmitted at each slot is multiplied by a cyclic shifted length-12 cell-specific sequence. The result thereof is transmitted at a corresponding DFTS-OFDM symbol.

For example, a parameter simultaneousAckNackAndCQI is provided by an associated higher layer as a RRC parameter. Such a RRC parameter is a parameter for determining instructing of user equipment to perform simultaneous transmission of HARQ ACK/NACK and a periodic CSI. When the RRC parameter is set it performs simultaneous transmission of HARQ ACK/NACK and a periodic CSI, user equipment becomes enabled to simultaneously transmit HARQ ACK/

NACK and a periodic CSI using one of PUCCH formats 2a and 2b at a corresponding subframe.

Figure 3:
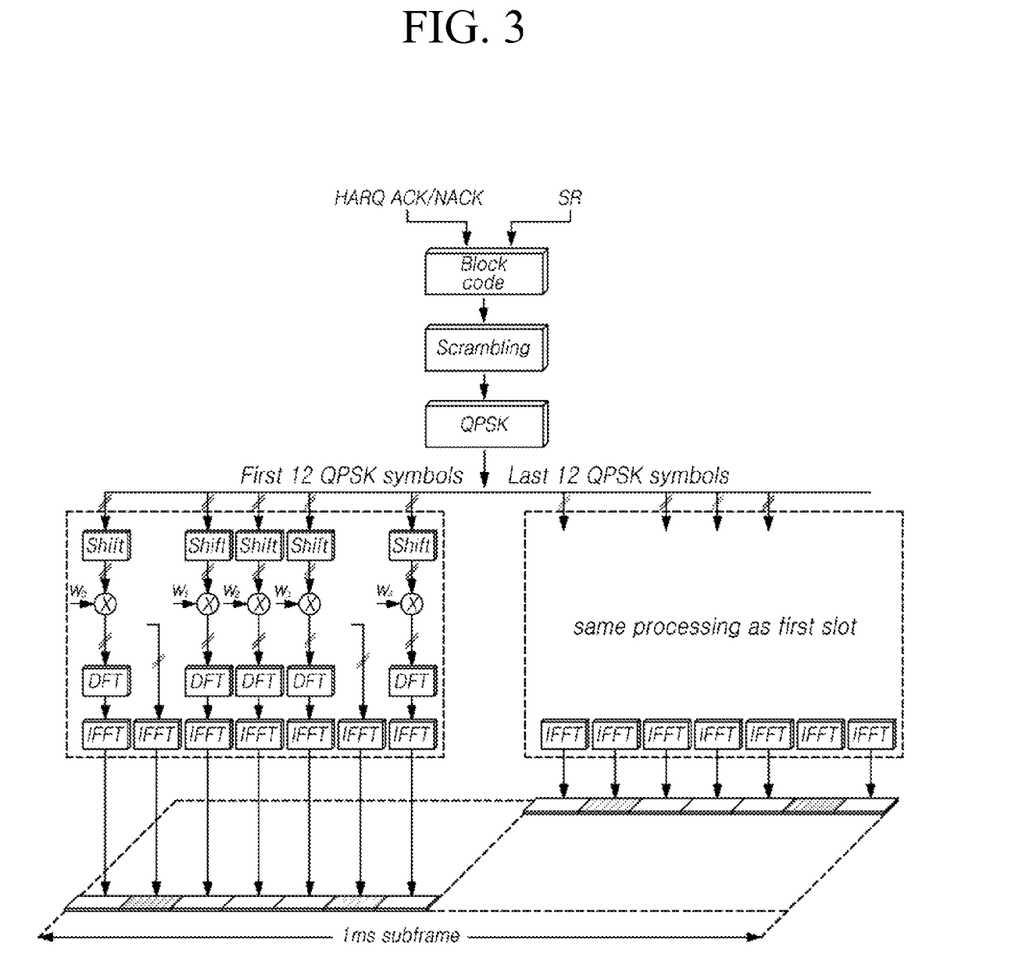
FIG. 3 is a diagram illustrating a PUCCH format 3 in accordance with at least one embodiment.

FIG. 3 is a diagram illustrating a PUCCH format 3 in accordance with at least one embodiment.

Referring to FIG. 3, a PUCCH format 3 is based on DFT-precoded OFDM which is the same transmission method used for an uplink shared channel (UL-SCH). One or two HARQ ACK/NACK bits per each downlink component subcarrier are concatenated with a scheduling request (SR) bit when the SR is present.

In the PUCCH format 3, transmission information is block-coded and scrambled to forty eight bits by a cell-specific scrambling sequence. The forty eight bits are QPSK-modulated and divided to two groups each having twelve QPSK symbols.

In case of a normal CP, twelve QPSK symbols are transmitted at five symbols of each slot and an uplink DM-RS is transmitted at two symbols of each slot.

Each QPSK symbol, transmitted at five symbols of each slot, is multiplied by a cyclic shifted length-12 cell-specific sequence. The result thereof is transmitted at a corresponding DFT-precoded OFDM symbol. Each one of five OFDM symbols is multiplied by a length-5 orthogonal sequence. In this case, the same length-5 sequence might be used for each slot or a different length-5 sequence might be used for each slot.

In case of an extended CP having six DFTS-OFMS per each slot, the same structure is used. However, each slot includes one uplink DM-RS symbol, instead of two uplink DM-RS symbols.

In downlink carrier aggregation, multiple HARQ ACK/NACK bits might be required to be fed back in case of performing simultaneous transmission on multiple component subcarriers. User equipment capable of using more than two downlink component subcarriers may be required to support a PUCCH format 3. That is, user equipment capable of using more than four bits for HARQ ACK/NACK might be required to support a PUCCH format 3.

For example, a parameter simultaneousAckNackAndCQI-Farmat3-r11 is provided by an associated higher layer as a RRC parameter. Such a parameter simultaneousAckNackAndCQI-Farmat3-r11 is a parameter for determining instructing of user terminal to perform simultaneous transmission of HARQ ACK/NACK and a periodic CSI using a PUCCH format 3. When such a parameter simultaneousAckNackAndCQI-Farmat3-r11 is set instruct user equipment to perform the simultaneous transmission of HARQ ACK/NACK and a periodic CSI, user equipment might be enabled to simultaneously transmit HARQ ACK/NACK and a periodic CSI using a PUCCH format 3 at a corresponding subframe.

Referring to FIG. 2 and FIG. 3, when user equipment is configured with a PUCCH format 3 from a transmission/reception point and when a new RRC parameter simultaneousAckNackAndCQI-Format3-r11 is defined to be set for instructing user equipment to perform simultaneous transmission of a periodic CSI and a HARQ ACK/NACK using the PUCCH format 3, it might be necessary to define a new operation of user equipment according to the new RRC parameter simultaneousAckNackAndCQI-Farmat3-r11. In this case, an ambiguity problem might be encountered in operation of user equipment according to configurations of an existing parameter simultaneousAckNackAndCQI and configurations of the new parameter simultaneousAckNackAndCQI-Format3-r11. In addition, it might be required to define new operation of user equipment according to the combination of the newly defined parameter and the existing parameters.

For time division duplex (TDD), HARQ ACK/NACK might be transmitted through a corresponding PUCCH format 3 although the user equipment is configured with single cell, not a carrier aggregation environment, unlikely to frequency division duplex (FDD). Accordingly, the ambiguity problem might be generated in operation of user equipment by the configurations of the existing parameters and the newly defined parameter.

In addition, in case of PUCCH formats 2a and 2b, simultaneous transmission with a SRS is not allowed. In case of a PUCCH format 3, the simultaneous transmission with a SRS is allowed if the user equipment is configured with a shortened PUCCH format 3, not a normal PUCCH format 3. Accordingly, a new operation of user equipment might be required to be defined for simultaneous transmission of a SRS.

In accordance with at least one embodiment, a method and apparatus are provided for transmitting and multiplexing an uplink control channel for transmitting data from user equipment through an uplink in a carrier aggregation environment. Furthermore, a method and apparatus are provided for multiplexing an uplink control channel and a sounding reference signal in accordance with at least one embodiment.

Particularly, the method and apparatus in accordance with at least one embodiment might solve an ambiguity problem in operation of user equipment, which might be caused by configurations of an existing first parameter and a newly defined second parameter in transmission of a control channel including an uplink HARQ ACK/NACK and a periodic CSI. For example, the existing first parameter is a parameter simultaneousAckNackAndCQI and the newly defined second parameter is a parameter simultaneousAckNackAndCQI-Format3-r11. Furthermore, the method and apparatus in accordance with at least one embodiment provide operation of user equipment for simultaneous transmission according to the combination of the existing first parameter (e.g., simultaneousAckNackAndCQI) and the new second parameter (e.g., simultaneousAckNackAndCQI-Format3-r11). In addition, the method and apparatus in accordance with at least one embodiment provide an operation of user equipment for simultaneous transmission of a SRS by defining new additional operation thereof.

Figure 4:
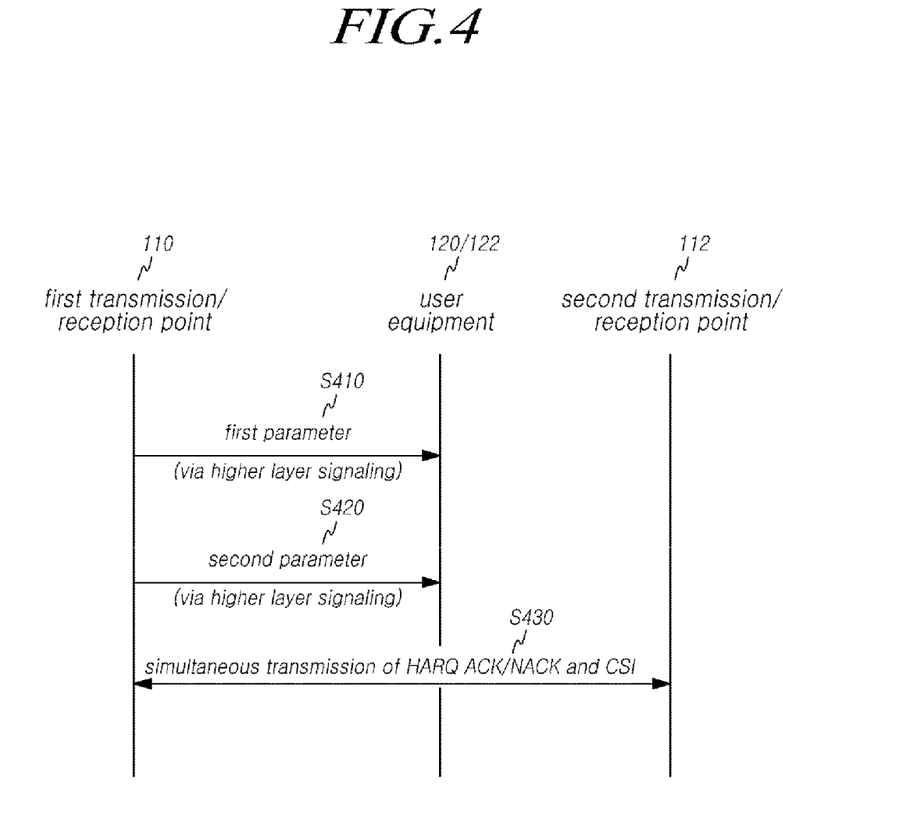
FIG. 4 is a flowchart illustrating a method for transmitting and receiving an uplink control channel in a wireless communication system in accordance with another embodiment.

FIG. 4 is a flowchart illustrating a method for transmitting and receiving an uplink control channel in a wireless communication system in accordance with another embodiment.

Referring to FIG. 4, in a wireless communication system including first transmission/reception point 110, second transmission/reception point 120, and at least one of user equipments 120 and 122. At step S410, a first parameter is transmitted and received. The first parameter is for instructing simultaneous transmission of single HARQ A/N and a CSI using PUCH formats 2, 2a, and 2b. At step S420, a second parameter is transmitted and received. The second parameter is for instructing simultaneous transmission of multiple HARQ ACK/NACK and a CSI using a PUCCH format 3. At step S430, the simultaneous transmission of the HARQ ACK/NACK and the CSI on a PUCCH is performed using PUCCH format 2/2a/2b and the PUCCH format 3. At the steps S410 and S420, the first parameter and the second parameter might be transmitted by different higher layer signals, for example, RRC signals (e.g., RRC messages). In this case, the steps S410 and S420 might be performed independently. When the first parameter and the second parameter are included in the same RRC message and transmitted, the steps S410 and S420 might be performed as one process step.

In view of first transmission/reception point 110, first transmission/reception point 110 transmits a first parameter, through an associated higher layer signaling, to at least one of user equipments 120 and 122 at step S410. At step S420, first transmission/reception point 110 transmits a second parameter, through an associated higher layer signaling, to at least one of user equipments 120 and 122. At step S430, first transmission/reception point 110 receives a PUCCH that performs simultaneous transmission of HARQ ACK/NACK and a CSI using one of PUCCH formats 2, 2a, 2b that might perform simultaneous transmission of HARQ ACK/NACK and a CSI and a PUCCH format 3 according to configurations of the first parameter and the second parameter.

In view of user equipment, user equipment 120 or 122 receives a first parameter, through an associated higher layer signaling, from first transmission/reception point 110 at step S410. At step S420, user equipment 120 or 122 receives a second parameter, through an associated higher layer signaling, from first transmission/reception point 110. At step S430, user equipment 120 or 122 might perform simultaneous transmission of HARQ ACK/NACK and a CSI to first transmission/reception point 110 or to second transmission/reception point 112 using one of PUCCH formats 2, 2a, 2b, and PUCCH format 3 according to configurations of the first parameter and the second parameter.

In a view of second transmission/reception point 112, second transmission/reception point 112 receives, from user equipment 120 or 122, a PUCCH that performs simultaneous transmission of HARQ ACK/NACK and a CSI using one of PUCCH formats 2, 2a, 2b that might perform simultaneous transmission of HARQ ACK/NACK and a CSI and PUCCH format 3 according to configurations of the first parameter and the second parameter.

Figure 5:
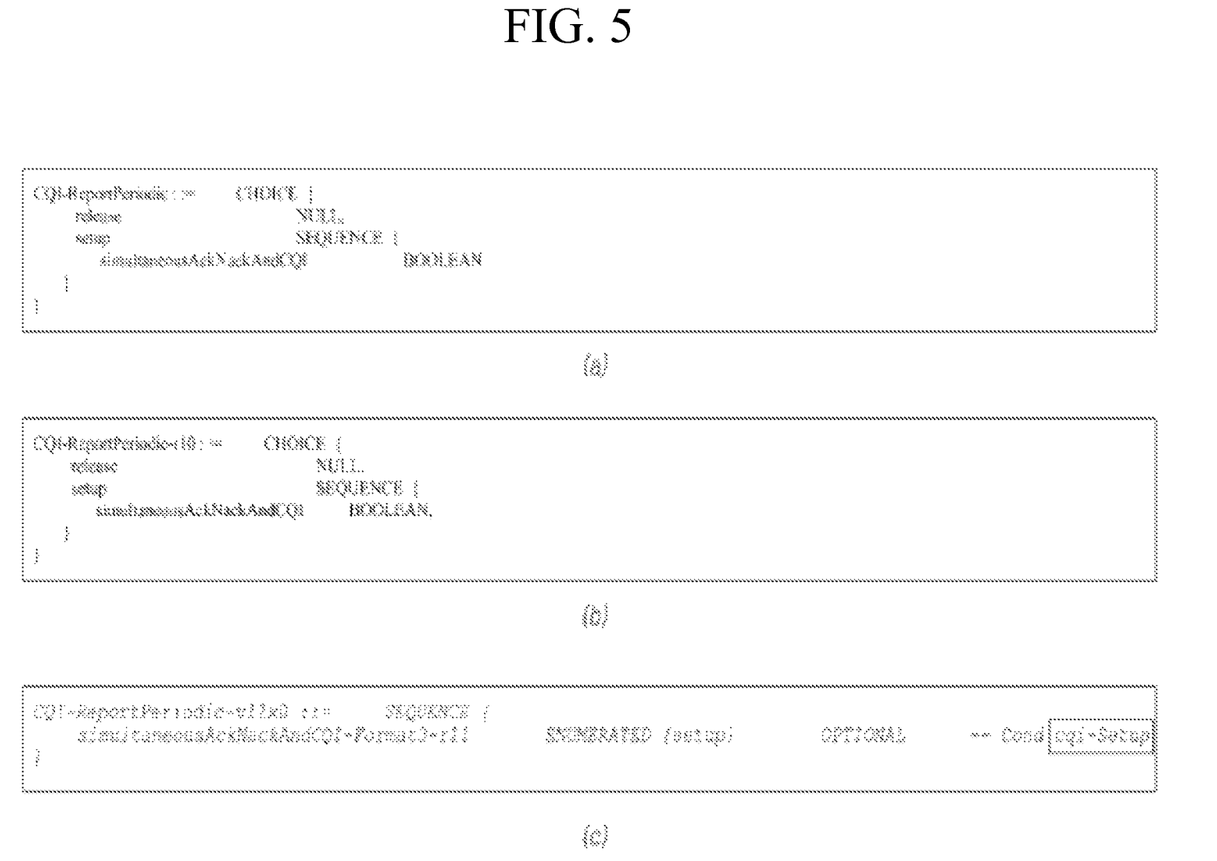
FIG. 5 shows examples of a CQI-ReportConfig message, which is one of RRC messages included in the first parameter (shown in diagrams (a) and (b) in FIG. 5) and the second parameter (shown in a diagram (c) of FIG. 5).

In accordance with at least one embodiment, the first parameter is a parameter simultaneousAckNackAndCQI as described in FIG. 2. The second parameter is a parameter simultaneousAckNackAndCQIFormat3-r11 as described in FIG. 3. The present invention, however, is not limited thereto. FIG. 5 shows examples of a CQI-ReportConfig message, which is one of RRC messages included in the first parameter (shown in diagrams (a) and (b) in FIG. 5) and the second parameter (shown in a diagram (c) of FIG. 5).

In FIG. 5, a first parameter (simultaneousAckNackAndCQI) might be set 0 or to 1 because the first parameter is generally not optional. A second parameter (simultaneousAckNackAndCQI-Format3-r11) might be set x or to 1 because the second parameter is optional. The second parameter is set x when a corresponding IE is optional or when the IE is not present. In case of configuration the second parameter to 0 while the IE is present, it is unnecessary to define the second parameter (simultaneousAckNackAndCQI-Format3-r11) differently from that when the IE is not present. Accordingly, a function ENUMERATED is used.

Table 2 shows configurations of the first and second parameters configured from first transmission/reception point 110 at steps S410 and S420.

TABLE 2

| Configuration | simultaneousAck-NackAndCQI | simultaneousAck-NackAndCQI-Format3-r11 |
|---|---|---|
| Case 1 | TRUE | TRUE |
| Case 2 | TRUE | FALSE |
| Case 3 | FALSE | TRUE |
| Case 4 | FALSE | FALSE |

The simultaneous transmission of a HARQ ACK/NACK and a CSI using one of PUCCH formats 2, 2a, and 2b and PUCCH format 3 might be performed differently according to configurations of the first parameter (e.g., simultaneousAckNackAndCQI) and the second parameter (e.g., simultaneousAckNackAndCQI-Format3-r11). Hereinafter, the different cases of simultaneous transmissions will be described.

For FDD as a duplex mode and for user equipment configured with more than one serving cell and with the PUCCH format 3, user equipment 120 or 122 might perform the simultaneous transmission of a HARQ ACK/NACK and a CSI on a PUCCH using a PUCCH format 3 at step S430 if following conditions are met: i) the second parameter (e.g., simultaneousAckNackAndCQI-Format3-r11) is set TRUE, and ii) a HARQ ACK/NACK is multiple HARQ ACK/NACK.

For FDD as a duplex mode and for user equipment configured with more than one serving cell and with the PUCCH format 3, user equipment 120 or 122 might perform the simultaneous transmission of HARQ ACK/NACK and a CSI on a PUCCH using PUCCH formats 2, 2a, and 2b at step S430 if following conditions are met: i) the second parameter (e.g., simultaneousAckNackAndCQI-Format3-r11) is set TRUE, ii) the first parameter (e.g., simultaneousAckNackAndCQI) is set TRUE, and iii) HARQ ACK/NACK is single HARQ ACK/NACK.

For TDD as a duplex mode and for user equipment configured with one serving cell and with the PUCCH format 3, user equipment 120 or 122 might perform the simultaneous transmission of HARQ ACK/NACK and a CSI on a PUCCH using a PUCCH format 3 at step S430 if following conditions are met: i) the second parameter (e.g., simultaneousAckNackAndCQI-Format3-r11) is set TRUE, and ii) a HARQ ACK/NACK is multiple HARQ ACK/NACK. In this case, the first parameter (e.g., simultaneousAckNackAndCQI) might be set one of TRUE or FALSE.

For FDD as a duplex mode, user equipment 120 or 122 might perform the simultaneous transmission of HARQ ACK/NACK and a CSI on a PUCCH using PUCCH formats 2, 2a, and 2b at step S430 if following conditions are met: i) the first parameter (e.g., simultaneousAckNackAndCQI) is set TRUE and ii) the second parameter (e.g., simultaneousAckNackAndCQI-Format3-r11) is set FALSE.

Detailed operations of simultaneous transmission of HARQ ACK/NACK and a CSI at step S430 might be different according to configurations (e.g., settings) of the first and second parameters configured from first transmission/reception point 110 at steps S410 and S420. Such detailed operations of user equipment will be described hereinafter. For convenience and ease of understanding, user equipment capable of performing simultaneous transmission of multiple HARQ ACK/NACK and a periodic CSI using the newly defined second parameter (e.g., simultaneousAckNackAndCQI-Format3-r11) is referred to as Rel-11 user equipment. A transmission/reception point capable of supporting the newly defined second parameter (e.g., simultaneousAckNackAndCQI-Format3-r11) is referred to as Rel-11 transmission/reception point. Furthermore, user equipment capable of performing simultaneous transmission of single HARQ ACK/NACK and a periodic CSI using PUCCH formats 2, 2a, and 2b by the existing first parameter (e.g., simultaneousAckNackAndCQI) is referred to as Rel-10 user equipment.

1) Operation of user equipment when the first parameter (e.g., simultaneousAckNackAndCQI) and the second parameter (e.g., simultaneousAckNackAndCQI-Format3-r11) are set TRUE is as follows.

Operation of user equipment is defined as follows. For FDD and for Rel-11 user equipment configured with carrier aggregation and with a PUCCH format 3, the Rel-11 user equipment is configured to simultaneously transmit multiple HARQ ACK/NACK and a periodic CSI using a PUCCH format 3 by the second parameter (e.g., simultaneousAckNackAndCQI-Format3-r11) from a Rel-11 transmission/reception point. Furthermore, the Rel-11 user equipment is configured to ignore (e.g., override) configurations of an existing RRC parameter (e.g., the first parameter simultaneousAckNackAndCQI) by configurations of the second parameter (e.g., simultaneousAckNackAndCQI-Format3-r11). The existing RRC parameter is a parameter instructing simultaneous transmission of single HARQ ACK/NACK and a periodic CSI using previously existing PUCCH formats 2, 2a, and 2b.

However, although the Rel-11 transmission/reception point instructs the Rel-10 user equipment to perform operation by the second parameter (e.g., simultaneousAckNackAndCQI-Format3-r11), the Rel-10 user equipment cannot be aware of this. Accordingly, the Rel-11 transmission/reception point sets the first parameter (e.g., simultaneousAckNackAndCQI) to TRUE and transmits the first parameter to the Rel-10 user equipment in order to instruct the Rel-10 user equipment to perform simultaneous transmission of HARQ ACK/NACK and a periodic CSI through PUCCH formats 2, 2a, and 2b.

In addition, although Rel-11 user equipment is configured with carrier aggregation and with a PUCCH format 3, the Rel-11 user equipment generally cannot use the PUCCH format 3 if ACK/NACK to be transmitted to a first cell (e.g., primary cell, Pcell, primary component carriers) and second cells (e.g., secondary cells, Scells, secondary component carriers) is single HARQ ACK/NACK. That is, since the first parameter (e.g., simultaneousAckNackAndCQI) is set TRUE when transmitting such single ACK/NACK and a periodic CSI, the user equipment is configured to transmit HARQ ACK/NACK and a periodic CSI through PUCCH formats 2, 2a, and 2b according to an associated operation configuration. In this case, the Rel-10 user equipment might be configured to ignore (override) configuration of the second parameter (e.g., simultaneousAckNackAndCQI-Format3-r11) from the Rel-11 transmission/reception point by configuration of the first parameter (e.g., simultaneousAckNackAndCQI). However, the present invention is not limited thereto.

In accordance with another embodiment, for Rel-11 user equipment configured with carrier aggregation and with a PUCCH format 3, the Rel-11 user equipment might be configured to perform the same operation by the second parameter (e.g., simultaneousAckNackAndCQI-Format3-r11). That is, the Rel-11 user equipment is configured to perform simultaneous transmission of single or multiple HARQ ACK/NACK and a periodic CSI using a PUCCH format 3 regardless whether ACK/NACK to be transmitted to a first cell (e.g., primary cell) and second cells (e.g., secondary cells) is single ACK/NACK or multiple ACK/NACK.

Unlike FDD, multiple HARQ ACK/NACK needs to be transmitted for TDD although user equipment is configured with single cell, not with carrier aggregation. For this case, operation of user equipment is defined as follows. For TDD and for Rel-11 user equipment configured with single serving cell and with a PUCCH format 3, the Rel-11 user equipment is configured to perform simultaneous transmission of multiple HARQ ACK/NACK and a periodic CSI using a PUCCH format 3 if a value of a downlink assignment index is equal to or greater than 1 (i.e., a downlink subframe for transmitting associated HARQ ACK/NACK is multiple) and if the second parameter (e.g., simultaneousAckNackAndCQI-Format3-r11) is set TRUE.

Meanwhile, the simultaneous transmission of HARQ ACK/NACK and a periodic CSI might be connected to transmission of a SRS. At first, operation of user equipment according to configurations of RRC parameters (first parameter (e.g., simultaneousAckNackAndCQI)) and a second parameter (e.g., simultaneousAckNackAndCQI-Format3-r11) will be described without distinguishing the operation according to whether a SRS is a periodic SRS (or trigger type 0) or an aperiodic SRS (or trigger type 1).

In accordance with at least one embodiment, operation of user equipment might be defined to simultaneously transmit single or multiple HARQ ACK/NACK, a periodic CSI, and a SRS using a shortened PUCCH format 3 in order to prevent frequent drop in SRS transmission. Such user equipment is configured to simultaneously transmit single or multiple HARQ ACK/NACK and a SRS using a shortened PUCCH format 3 when a subframe assigned to user equipment by a transmission/reception point is configured to as a cell-specific SRS subframe and when the third parameter (e.g., ackNackSRS-SimultaneousTransmission) is set TRUE.

In addition, operation of user equipment might be defined according to whether a SRS is a periodic SRS or an aperiodic SRS and according to configurations of two RRC parameters in accordance with at least one embodiment. Such operation will be described subsequently.

An aperiodic SRS is triggered by a specific purpose of a transmission/reception point. When transmission of such an aperiodic SRS is dropped (i.e., a SRS is not mapped to resource elements of the last symbol of a corresponding subframe), the transmission/reception point needs retransmitting a triggering message for an aperiodic SRS through a PDCCH. Such retransmission might cause increased overhead of a PDCCH. Therefore, user equipment might be configured to perform operation with a higher priority for an aperiodic SRS as compared to a periodic SRS according to configurations of two RRC parameters (e.g., the first parameter (simultaneousAckNackAndCQI) and the second parameter (simultaneousAckNackAndCQI-Format3-r11)). That is, user equipment might be defined to perform simultaneous transmission of single or multiple HARQ ACK/NACK, a periodic CSI, and an aperiodic SRS using a shortened PUCCH format 3 when a third parameter (e.g., ackNackSRS-SimultaneousTransmission) is set TRUE. Such a third parameter is set for user equipment by a transmission/reception point in a cell-specific SRS subframe which is set by a transmission/reception point for transmitting a periodic SRS and an aperiodic SRS. Such defined operation of the user equipment might transmit only the aperiodic SRS and drop the periodic SRS.

In other words, when a transmission/reception point sets a third parameter (e.g., ackNackSRS-SimultaneousTransmission) to TRUE in a cell-specific SRS subframe, operation of user equipment might be defined to perform simultaneous transmission of single or multiple HARQ ACK/NACK, a periodic CSI, and an aperiodic SRS using a shortened PUCCH format 3 if the second parameter (e.g., simultaneousAckNackAndCQI-Format3-r11) from a transmission/reception point is set TRUE.

2) Operation of user equipment performed when the first parameter (e.g., simultaneousAckNackAndCQI) is set TRUE and the second parameter (e.g., simultaneousAckNackAndCQI-Format3-r11) is set FALSE is as follows.

Since the second parameter is set FALSE, there is no ambiguity problem in operation of user equipment. Accordingly, user equipment might perform simultaneous transmission of HARQ ACK/NACK and a CSI using PUCCH formats 2, 2a, and 2b when a first parameter (e.g., simultaneousAckNackAndCQI) is set TRUE.

3) Operation of user equipment performed when the first parameter (e.g., simultaneousAckNackAndCQI) is set FALSE and when the second parameter (e.g., simultaneousAckNackAndCQI-Format3-r11) is set TRUE is as follows.

For FDD and for Rel-11 user equipment configured with carrier aggregation and with a PUCCH format 3, the Rel-11 user equipment is configured to transmit multiple HARQ ACK/NACK and a periodic CSI using a PUCCH format 3 by a RRC parameter (e.g., a second parameter (simultaneousAckNackAndCQI-Format3-r11)) from a Rel-11 transmission/reception point.

In accordance with another embodiment, for Rel-11 user equipment configured with carrier aggregation and with a PUCCH format 3, the Rel-11 user equipment might be configured to perform the same consistent operation by the second parameter (e.g., simultaneousAckNackAndCQI-Format3-r11). That is, the Rel-11 user equipment is configured to perform simultaneous transmission of single or multiple HARQ ACK/NACK and a periodic CSI using a PUCCH format 3 regardless whether ACK/NACK to be transmitted to a first cell (e.g., primary cell) and second cells (e.g., secondary cells) is single ACK/NACK or multiple ACK/NACK.

Unlike FDD, it might be required to transmit multiple HARQ ACK/NACK for TDD although user equipment is configured with a single cell, not with carrier aggregation. For TDD and for corresponding Rel-11 user equipment configured with a PUCCH format 3, the user equipment is defined to perform multiple HARQ ACK/NACK and a periodic CSI using a PUCCH format 3 if a value of a downlink assignment index is equal to and/or greater than 1 (e.g., a corresponding downlink subframe for transmitting a corresponding HARQ ACK/NACK is multiple) and if a second parameter (e.g., simultaneousAckNackAndCQI-Format3-r11) is set TRUE.

Meanwhile, the simultaneous transmission of HARQ ACK/NACK and a CSI might be connected to transmission of a SRS. At first, an operation of user equipment according to configurations of two RRC parameters (e.g., the first parameter (simultaneousAckNackAndCQI) and the second parameter (e.g., simultaneousAckNackAndCQI-Format3-r11)) will be described without distinguishing operating according to whether a SRS is a periodic SRS (e.g., trigger type 0) or an aperiodic SRS (e.g., trigger type 1).

In order to prevent frequent drop in SRS transmission, operation of user equipment might be defined for simultaneously transmitting single or multiple HARQ ACK/NACK, a periodic CSI, and a SRS using a shortened PUCCH format. That is, user equipment is configured to simultaneously transmit single or multiple HARQ ACK/NACK and a SRS using a shortened PUCCH format 3 if a subframe, set to user equipment by a transmission/reception point, is set as a cell-specific SRS subframe and if a third parameter (e.g., ackNackSRS-SimultaneousTransmission) is set TRUE.

In addition, operation of user equipment might be defined according to whether a SRS is a periodic SRS and an aperiodic SRS and according to the configurations of the two RRC parameters. Such operation of user equipment will be described subsequently.

An aperiodic SRS is triggered by a specific purpose of a transmission/reception point. When the transmission of such aperiodic SRS is dropped, a transmission/reception point needs retransmission of a triggering message for the aperiodic SRS through a PDCCH. Such retransmission causes increased overhead of a PDCCH. Therefore, user equipment might perform the operation with a higher priority for the aperiodic SRS as compared to a periodic SRS according to configurations of two parameters (e.g., the first parameter (simultaneousAckNackAndCQI) and the second parameter (simultaneousAckNackAndCQI-Format3-r11)). That is, operation of user equipment might be defined to perform simultaneous transmission of single or multiple HARQ ACK/NACK, a periodic CSI, and an aperiodic SRS using a shortened PUCCH format 3 if a third parameter (e.g., ackNackSRS-SimultaneousTransmission) is set TRUE at a cell-specific SRS subframe. The third parameter is set to user equipment by an associated transmission/reception point and the cell-specific SRS subframe is set from a transmission/reception point for transmitting a periodic SRS and an aperiodic SRS. Such operation enables user equipment to transmit an periodic SRS only and to drop a periodic SRS. In other words, if a third parameter (e.g., ackNackSRS-SimultaneousTransmission) is set TRUE by a transmission/reception point at a cell-specific SRS subframe and if a second parameter (e.g., simultaneousAckNackAndCQI-Format3-r11) is set TRUE, operation of user equipment might be defined to perform simultaneous transmission of single or multiple HARQ ACK/NACK, a periodic CSI, and an aperiodic SRS using a shortened PUCCH format 3.

4) Operation of user equipment performed when the first parameter (e.g., simultaneousAckNackAndCQI) is set FALSE and the second parameter (e.g., simultaneousAckNackAndCQI-Format3-r11) is set FALSE is as follows.

For this case, both of the first parameter (e.g., simultaneousAckNackAndCQI) and the second parameter (e.g., simultaneousAckNackAndCQI-Format3-r11) are set FALSE. Accordingly, operation of user equipment is defined to not perform simultaneous transmission of HARQ ACK/NACK and CSI. That is, in this case, user equipment is configured to transmit single or multiple HARQ ACK/NACK through a PUCCH format and to drop a CSI. In case of simultaneous transmission with a SRS, user equipment is configured to perform simultaneous transmission of HARQ ACK/NACK and a SRS with excluding transmission of a periodic CSI.

Figure 6:
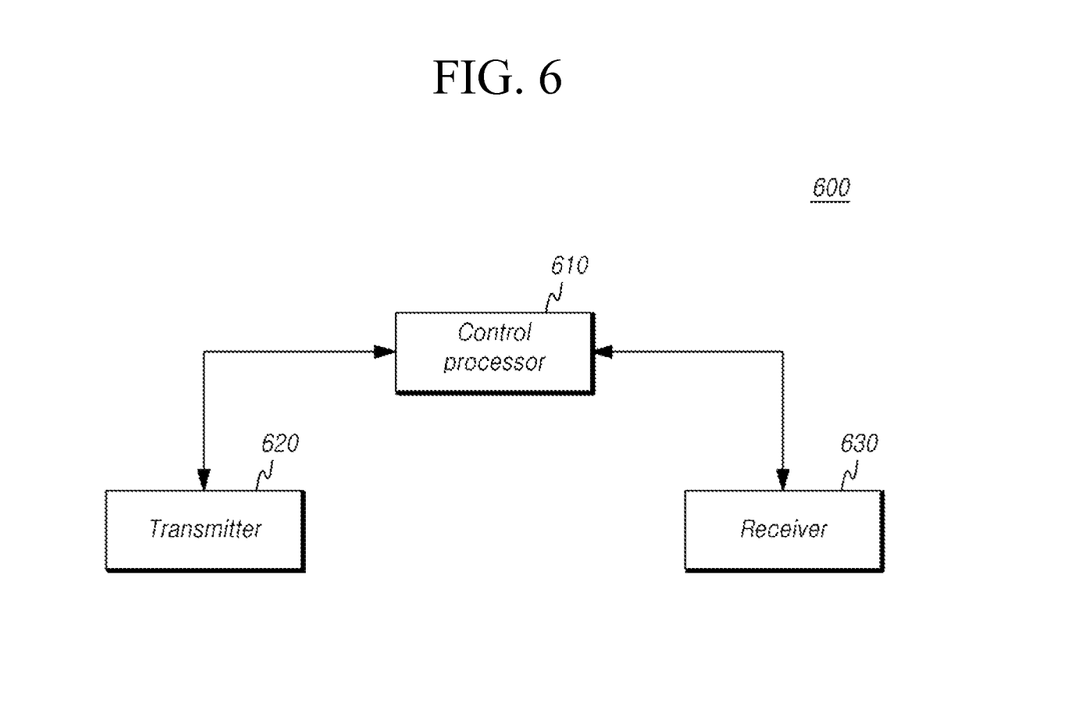
FIG. 6 shows configuration of a transmission/reception point in accordance with at least one embodiment.

FIG. 6 shows configuration of a transmission/reception point in accordance with at least one embodiment.

Referring to FIG. 6, transmission/reception point 600 might operate as a base station in accordance with at least one embodiment. Such transmission/reception point 600 includes control processor 610, transmitter 620 and receiver 630.

Control processor 610 controls overall operation for eliminating an ambiguity problem in operation of user equipment. For example, control processor 610 controls operation of user equipment according to configurations of an existing first parameter (e.g., simultaneousAckNackAndCQI) and a second parameter (e.g., simultaneousAckNackAndCQI-Format3-r11) to transmit a control channel including uplink HARQ ACK/NACK and a periodic CSI in accordance with at least one embodiment.

Transmitter 620 and receiver 630 are configured to transmit and to receive signals, messages, and data, necessary for performing operations in accordance with at least one embodiment.

Transmitter 620 transmits a first parameter, provided by an associated higher layer, to user equipment. The first parameter is for instructing simultaneous transmission of single HARQ ACK/NACK and a CSI using PUCCH formats 2/2a/2b. Transmitter 620 transmits a second parameter, provided by an associated higher layer, to user equipment. The second parameter is employed for instructing simultaneous transmission of HARQ ACK/NACK and a CSI using one of PUCCH formats 2, 2a, and 2b and a PUCCH format 3.

For user equipment configured with PUCCH format 3, receiver 630 might receive a PUCCH that performs simultaneous transmission of HARQ ACK/NACK and a CSI on a PUCCH using one of PUCCH formats 2/2a/2b and PUCCH format 3 according to configurations of the first parameter and the second parameter.

For FDD as a duplex mode and for user equipment configured with more than one serving cell, receiver 630 might receive a PUCCH that performs simultaneous transmission of HARQ ACK/NACK and a CSI on PUCCH using a PUCCH format 3 if the second parameter is set TRUE and if HARQ ACK/NACK is multiple HARQ ACK/NACK.

For FDD as a duplex mode and for user equipment configured with more than one serving cell, receiver 630 might receive a PUCCH that performs simultaneous transmission of HARQ ACK/NACK and a CSI on a PUCCH using PUCCH formats 2/2a/2b if the second parameter is set TRUE and if HARQ ACK/NACK is single HARQ ACK/NACK.

For TDD as a duplex mode and for user equipment configured with single serving cell, receiver 630 might receive a PUCCH that performs simultaneous transmission of HARQ ACK/NACK on a PUCCH using a PUCCH format 3 if the second parameter is set TRUE and if HARQ ACK/NACK is multiple HARQ ACK/NACK. In this case, the first parameter might be set one of TRUE and FALSE.

For FDD as a duplex mode, receiver 630 might receive a PUCCH that performs simultaneous transmission of HARQ ACK/NACK and a CSI on a PUCCH using PUCCH format 2/2a/2b if the first parameter is set TRUE and if the second parameter is set FALSE.

Figure 7:
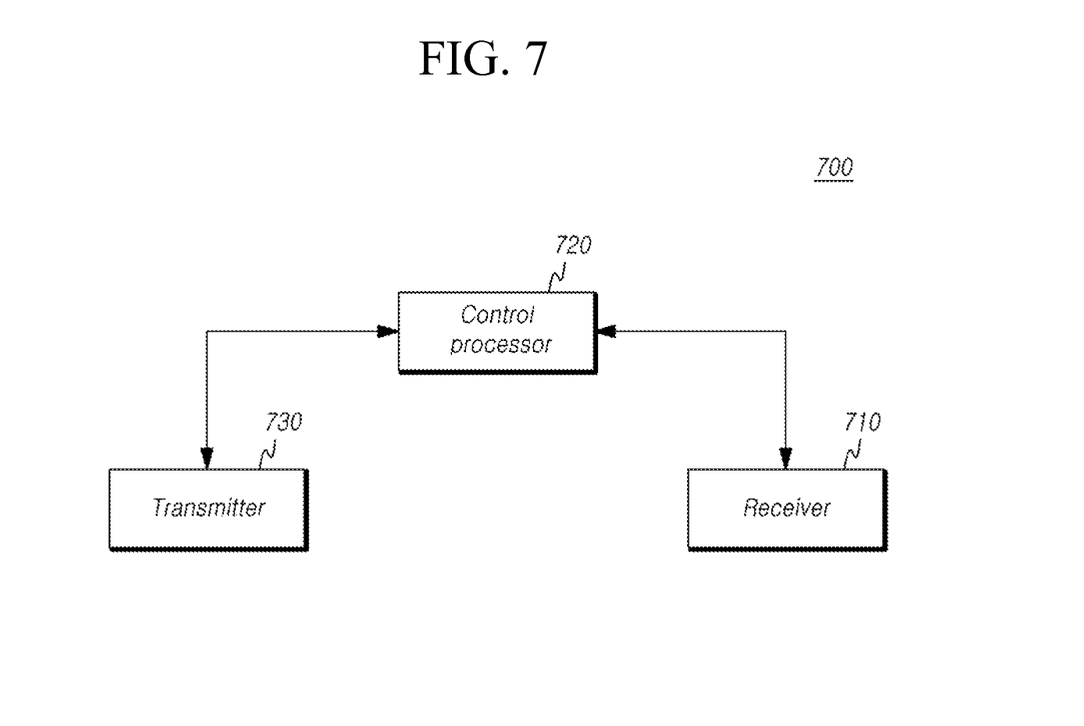
FIG. 7 shows configuration of user equipment in accordance with at least one embodiment.

FIG. 7 shows configuration of user equipment in accordance with at least one embodiment.

Referring to FIG. 7, user equipment 700 includes receiver 710, control processor 720, and transmitter 730.

Receiver 710 receives downlink control information, data, and messages from a transmission/reception point through a corresponding channel.

For user equipment configured with a PUCCH format 3, receiver 710 might receive a first parameter and a second parameter, provided by associated higher layer, from at least one associated transmission/reception point. The first parameter is employed for instructing simultaneous transmission of single HARQ A/N and a CSI on a PUCCH using PUCCH format 2/2a/2b. The second parameter is employed for instructing simultaneous transmission of multiple HARQ ACK/NACK and a CSI on a PUCCH using a PUCCH format 3.

Control processor 720 controls overall operation of user equipment when solving an ambiguity problem in operation of user equipment by defining operation of user equipment to perform simultaneous transmission of a control channel including uplink HARQ ACK/NACK and a periodic CSI according to configurations of a first parameter and a second parameter in accordance with at least one embodiment.

Transmitter 370 transmits an uplink reference signal and an uplink channel to a transmission/reception point.

Transmitter 730 might perform simultaneous transmission of HARQ ACK/NACK and a CSI on a PUCCH using one of the PUCCH format 2/2a/2b and the PUCCH format 3 according to configurations of the first parameter and the second parameter.

For FDD as a duplex mode and for user equipment configured with more than one serving cell, transmitter 730 might perform simultaneous transmission of HARQ ACK/NACK and a CSI on a PUCCH using the PUCCH format 3 if the second parameter is set TRUE and if the HARQ ACK/NACK is multiple HARQ ACK/NACK.

For FDD as a duplex mode and for user equipment configured with more than one serving cell, transmitter 730 might perform simultaneous transmission of HARQ ACK/NACK and a CSI on PUCCH using PUCCH format 2/2a/2b if the second parameter is set TRUE, if the first parameter is set TRUE, and if HARQ ACK/NACK is single HARQ ACK/NACK.

For TDD as a duplex mode and for user equipment configured with single serving cell, transmitter 730 might perform simultaneous transmission of HARQ ACK/NACK and a CSI on a PUCCH using a PUCCH format 3 if the second parameter is set TRUE and if HARQ ACK/NACK is multiple HARQ ACK/NACK. The first parameter might be set one of TRUE and FALSE.

For FDD as a duplex mode, transmitter 730 might perform simultaneous transmission of HARQ ACK/NACK and a CSI on a PUCCH using PUCCH format 2/2a/2b if the first parameter is set TRUE and if the second parameter is set FALSE.

As described, operation of user equipment is defined according to configurations of the existing first parameter (e.g., simultaneousAckNackAndCQI) and the second parameter (e.g., simultaneousAckNackAndCQI-Format3-r11) in transmission of a control channel including uplink HARQ ACK/NACK and a periodic CSI in accordance with at least one embodiment. Accordingly, an ambiguity problem of user equipment, which might be caused by configuration of a transmission/reception point, can be eliminated.

At least one embodiment of the present invention was described with reference to the accompanying drawings, but the present invention is not limited thereto.

The first parameter, the second parameter, and the third parameter were respectively described as simultaneousAckNackAndCQI, simultaneousAckNackAndCQI-Format3-r11, and ackNackSRS-SimultaneousTransmission. However, the present invention is not limited thereto. Any parameters performing the same function might be applied to the present invention.

Although contents of technical standards referred to in the above-described embodiments are omitted for brief descriptions of the specification, the related contents of the technical standards may constitute a portion of the present specification. Accordingly, adding a portion of the standards-related content in the specification and/or the claims will be construed as being included in the scope of the present invention.

More specifically, the included documents may constitute a portion of the present specification as a portion of published documents. Accordingly, adding a portion of standards-related contents and/or standard documents in the description and/or the claims will be construed as being included in the scope of the present invention.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A method of transmitting an uplink control channel at user equipment configured with physical uplink control channel (PUCCH) format 3, the method comprising:

receiving a first parameter, through an associated higher layer signaling, from a transmission/reception point, wherein the first parameter instructs simultaneous transmission of single hybrid automatic repeat request (HARQ) acknowledgement/negative-acknowledgement (ACK/NACK) and channel state information (CSI) on PUCCH format 2/2a/2b;

receiving a second parameter, through an associated higher layer signaling, from the transmission/reception point, wherein the second parameter instructs simultaneous transmission of multiple HARQ ACK/NACK and CSI on the PUCCH format 3; and performing simultaneous transmission of HARQ ACK/NACK and CSI on one of the PUCCH format 2/2a/2b and the PUCCH format 3 according to configurations of the first parameter and the second parameter.

2. The method of claim 1, wherein the performing simultaneous transmission comprises:

performing simultaneous transmission of HARQ ACK/NACK and CSI on the PUCCH format 3 if the second parameter is set TRUE if the HARQ ACK/NACK is multiple HARQ ACK/NACK if a duplex mode is a frequency division duplex (FDD) and if the user equipment is configured with more than one cell.

3. The method of claim 1, wherein the performing simultaneous transmission comprises:

performing simultaneous transmission of HARQ ACK/NACK and CSI on the PUCCH format 2/2a/2b if the first parameter is set TRUE if the HARQ ACK/NACK is single HARQ ACK/NACK if a duplex mode is a frequency division duplex (FDD) and if the user equipment is configured with more than one cell.

4. The method of claim 1, wherein the performing simultaneous transmission comprises:

performing simultaneous transmission of HARQ ACK/NACK and CSI on the PUCCH format 3 if the second parameter is set TRUE if the HARQ ACK/NACK is multiple HARQ ACK/NACK if a duplex mode is a time division duplex (TDD) and if the user equipment is configured with one cell.

5. The method of claim 1, wherein the performing simultaneous transmission comprises:

performing simultaneous transmission of HARQ ACK/NACK and CSI on the PUCCH format 2/2a/2b if the first parameter is set TRUE if the second parameter is set FALSE and if a duplex mode is a frequency division duplex (FDD).

6. The method of claim 1, wherein the performing simultaneous transmission comprises:

transmitting HARQ ACK/NACK on one of the PUCCH format 2/2a/2b and the PUCCH format 3 and dropping periodic CSI if the first parameter is set FALSE and if the second parameter is set FALSE.

7. A method of receiving an uplink control channel at a transmission/reception point, the method comprising:

transmitting a first parameter, through an associated higher layer signaling, to user equipment, wherein the first parameter instructs simultaneous transmission of single hybrid automatic repeat request (HARQ) acknowledgement/negative-acknowledgement (ACK/NACK) and channel state information (CSI) on physical uplink control channel (PUCCH) format 2/2a/2b;

transmitting a second parameter, through an associated higher layer signaling, to the user equipment, wherein the second parameter instructs simultaneous transmission of multiple HARQ ACK/NACK and CSI using PUCCH format 3; and receiving a PUCCH that performs simultaneous transmission of HARQ ACK/NACK and CSI on one of the PUCCH format 2/2a/2b and the PUCCH format 3 according to configurations of the first parameter and the second parameter if the user equipment is configured with the PUCCH format 3.

8. The method of claim 7, wherein the receiving a PUCCH comprises:

receiving a PUCCH that performs simultaneous transmission of HARQ ACK/NACK and CSI on the PUCCH format 3 if the second parameter is set TRUE if the HARQ ACK/NACK is multiple HARQ ACK/NACK if a duplex mode is a frequency division duplex (FDD) and if the user equipment is configured with more than one cell.

9. The method of claim 7, wherein the receiving a PUCCH comprises:

receiving a PUCCH that performs simultaneous transmission of HARQ ACK/NACK and CSI on the PUCCH format 2/2a/2b if the first parameter is set TRUE if the HARQ ACK/NACK is single HARQ ACK/NACK if a duplex mode is a frequency division duplex (FDD) and if the user equipment is configured with more than one cell.

10. The method of claim 7, wherein the receiving a PUCCH comprises:

receiving a PUCCH that performs simultaneous transmission of HARQ ACK/NACK and CSI on the PUCCH format 3 if the second parameter is set TRUE and if the HARQ ACK/NACK is multiple HARQ ACK/NACK if a duplex mode is a time division duplex (TDD) and if the user equipment is configured with one cell.

11. The method of claim 7, wherein the receiving a PUCCH comprises:

receiving a PUCCH that performs simultaneous transmission of HARQ ACK/NACK and CSI on the PUCCH format 2/2a/2b if the first parameter is set TRUE if the second parameter is set FALSE and if a duplex mode is a frequency division duplex (FDD).

12. The method of claim 7, wherein the receiving a PUCCH comprises:

receiving a PUCCH that transmits HARQ ACK/NACK on one of the PUCCH 2/2a/2b and the PUCCH format 3 and drops periodic CSI if the first parameter is set FALSE and if the second parameter is set FALSE.

13. User equipment configured with a physical uplink control channel (PUCCH) format 3, the user equipment comprising;

a receiver configured to receive a first parameter, through an associated higher layer signaling, from a transmission/reception point, wherein the first parameter instructs simultaneous transmission of single hybrid automatic repeat request (HARQ) acknowledgement/negative-acknowledgement (ACK/NACK) and channel state information (CSI) on PUCCH format 2/2a/2b and to receive a second parameter, through an associated higher layer signaling, from the transmission/reception point, wherein the second parameter instructs simultaneous transmission of multiple HARQ ACK/NACK and CSI on the PUCCH format 3; and a transmitter configured to perform simultaneous transmission of HARQ ACK/NACK and CSI on one of the PUCCH format 2/2a/2b and the PUCCH format 3 according to configurations of the first parameter and the second parameter.

14. The user equipment of claim 13, wherein the transmitter is configured to:

perform simultaneous transmission of HARQ ACK/NACK and CSI on the PUCCH format 3 if the second parameter is set TRUE if the HARQ ACK/NACK is multiple HARQ ACK/NACK if a duplex mode is a frequency division duplex (FDD) and if the user equipment is configured with more than one cell.

15. The user equipment of claim 13, wherein the transmitter is configured to:
perform simultaneous transmission of HARQ ACK/NACK and CSI on the PUCCH format 2/2a/2b if the first parameter is set TRUE if the HARQ ACK/NACK is single HARQ ACK/NACK if a duplex mode is a frequency division duplex (FDD) and if the user equipment is configured with more than one cell.

16. The user equipment of claim 13, wherein the transmitter is configured to:
perform simultaneous transmission of HARQ ACK/NACK and CSI the PUCCH format 3 if the second parameter is set TRUE if the HARQ ACK/NACK is multiple HARQ ACK/NACK if a duplex mode is a time division duplex (TDD) and if the user equipment is configured with one cell.

17. The user equipment of claim 13, wherein the transmitter is configured to:
perform simultaneous transmission of HARQ ACK/NACK and CSI on the PUCCH 2/2a/2b if the first parameter is set TRUE if the second parameter is set FALSE and if a duplex mode is a frequency division duplex (FDD).

18. The user equipment of claim 13, wherein the transmitter is configured to:
transmit HARQ ACK/NACK on one of the PUCCH format 2/2a/2b and the PUCCH format 3 and drop periodic CSI if the first parameter is set FALSE and if the second parameter is set FALSE.

19. A transmission/reception point comprising:
a transmitter configured to:
transmit a first parameter, through an associated higher layer signaling, to user equipment, wherein the first parameter instructs simultaneous transmission of single hybrid automatic repeat request (HARQ) acknowledgement/negative-acknowledgement (ACK/NACK) and channel state information (CSI) on physical uplink control channel (PUCCH) format 2/2a/2b, and
transmit a second parameter, through an associated higher layer signaling, to the user equipment, wherein the second parameter instructs simultaneous transmission of multiple HARQ ACK/NACK and CSI on PUCCH format 3; and a receiver is configured to receive a PUCCH that performs simultaneous transmission of HARQ ACK/NACK and CSI on one of the PUCCH format 2/2a/2b and the PUCCH format 3 according to configurations of the first parameter and the second parameter if the user equipment is configured with the PUCCH format 3.

20. The transmission/reception point of claim 19, wherein the receiver is configured to:
receive a PUCCH that performs simultaneous transmission of HARQ ACK/NACK and CSI on the PUCCH format 3 if the second parameter is set TRUE if the HARQ ACK/NACK is multiple HARQ ACK/NACK if a duplex mode is a frequency division duplex (FDD) and if the user equipment is configured with more than one cell.

21. The transmission/reception point of claim 19, wherein the receiver is configured to:
receive a PUCCH that performs simultaneous transmission of HARQ ACK/NACK and CSI on the PUCCH format 2/2a/2b if the first parameter is set TRUE if the HARQ ACK/NACK is single HARQ ACK/NACK if a duplex mode is a frequency division duplex (FDD) and if the user equipment is configured with more than one cell.

22. The transmission/reception point of claim 19, wherein the receiver is configured to:
receive a PUCCH that performs simultaneous transmission of HARQ ACK/NACK and CSI on the PUCCH format 3 if the second parameter is set TRUE if the HARQ ACK/NACK is multiple HARQ ACK/NACK if a duplex mode is a time division duplex (TDD) and if the user equipment is configured with one cell.

23. The transmission/reception point of claim 19, wherein the receiver is configured to:
receive a PUCCH that performs simultaneous transmission of HARQ ACK/NACK and CSI on the PUCCH format 2/2a/2b if the first parameter is set TRUE if the second parameter is set FALSE and if a duplex mode is a frequency division duplex (FDD).

24. The transmission/reception point of claim 19, wherein the receiver is configured to:
receive a PUCCH that transmits HARQ ACK/NACK on one of the PUCCH format 2/2a/2b and the PUCCH format 3 and drops periodic CSI if the first parameter is set FALSE and if the second parameter is set FALSE.

* * * * *